Figure 3:
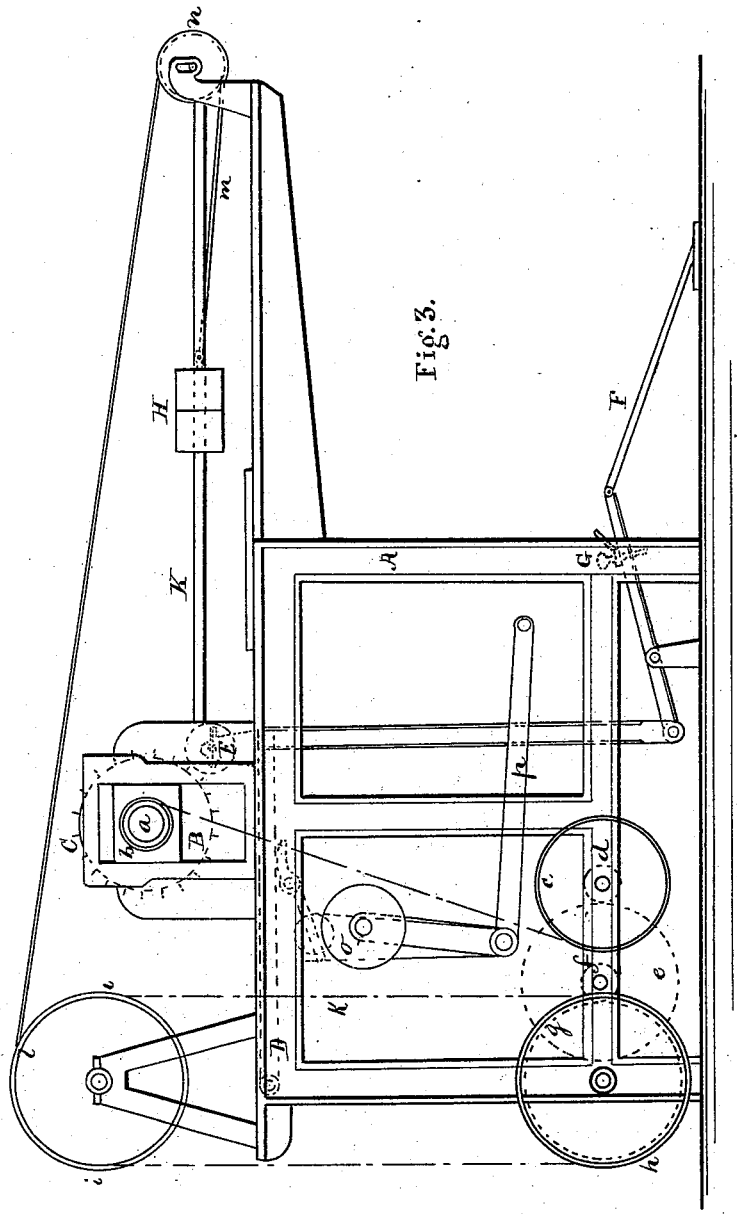

C. MOLINIER.
Machine for Dressing Hides and Skins.
No. 208,918. Patented Oct. 15, 1878.
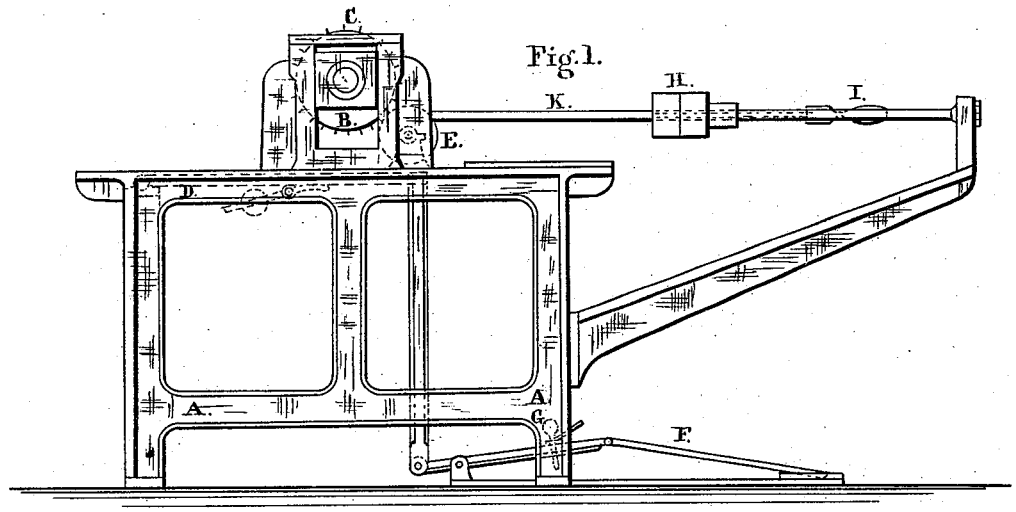
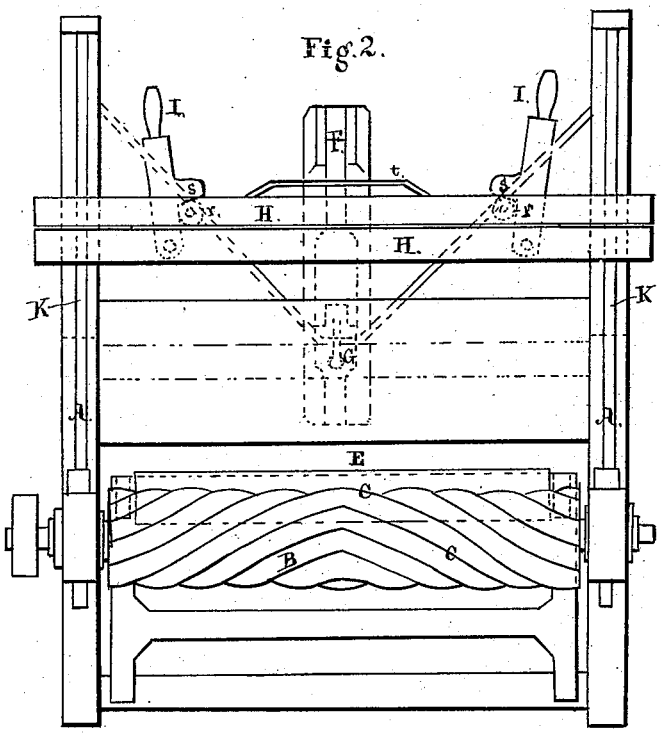

C. MOLINIER.
Machine for Dressing Hides and Skins.

No. 208,918. Patented Oct. 15, 1878.

Witnesses,
W. A. Butram
DeLancey H. Barclay.

Inventor
Charles Molinier,
by
R. D. Williams.
Attorney.

UNITED STATES PATENT OFFICE.

CHARLES MOLINIER, OF BUZET, FRANCE, ASSIGNOR TO CHARLES MOLINIER & CO., (LIMITED,) OF LONDON, ENGLAND.

IMPROVEMENT IN MACHINES FOR DRESSING HIDES AND SKINS.

Specification forming part of Letters Patent No. 208,918, dated October 15, 1878; application filed September 5, 1877; patented in France, May 23, 1873, and in England, April 4, 1874, and March 27, 1875.

*To all whom it may concern:*

Be it known that I, CHARLES MOLINIER, of Buzet, in the Department of Haute-Garonne and Republic of France, have invented an Improved Machine for Tawing and Dressing Skins, of which the following is a specification:

The object of my invention is to construct a machine for tawing and dressing skins that will permit any part of the skin under treatment to be kept as long as desired under the operation of the knives of a rotating cylinder, the pressure of the skin against the knives to be rapidly and accurately varied to suit the different thicknesses of the parts of a skin, and the skin to be easily shifted to bring different parts to the action of the knives by making the feed-roller to rise and fall by means of a regulated treadle-motion, in combination with a draw-bar, by which the passage of the skin through the machine may be regulated at the will of the workman, this draw-bar being made to pull open to receive the skins, and to gripe them securely when closed by locking-levers.

Upon the accompanying sheets of drawing, Figure 1, Sheet 1, represents a side view or elevation of a machine embodying my invention. Fig. 2, Sheet 1, is a plan view of same; and Fig. 3, Sheet 2, is a side view or elevation of a machine similar to that shown in Fig. 1, Sheet 1, but with power-gear applied to work the draw-bar.

Similar letters of reference are placed upon and denote similar parts where such parts appear in each of the figures, respectively.

A A are the side frames, upon which the knife-cylinder is carried; B, the knife-cylinder. This cylinder may be made to revolve by suitable gearing in connection with any available motive power. C C, the knives or blades which scrape, cut, or shave the skins. They may be made of steel, copper, or any suitable metal, and are preferably set helically upon the cylinder B, as shown. D, hinged table, carrying the feed-roller E; E, the feed roller or cylinder, covered with india-rubber or other elastic material to cushion the skin under treatment by the knives; F, treadle by which the hinged table and the roller E is raised and lowered; G, screw by which the length of movement of the treadle F is regulated, and thereby the pressure of the skin carried by the feed-roller E against the knives C C. It will be seen that by tightening this screw its lower end, projecting farther through the treadle, sooner meets a stop-plate, which arrests its journey and limits the rise of the table D and roller E. By loosening the screw the reverse effect is obtained, and the roller E coming closer to the knives they are made to operate deeper into the skin, if a same skin, or part of skin, or with the same power upon a thinner skin or part of skin, than that upon which they were operating before this screw was loosened. H, draw-bar. It is composed of two cross-pieces, each sliding on guide-rods and connected by two levers, and is intended to receive and hold the skin, so that the workman may give it to the roller E to be passed through the machine as quickly or as slowly as he may deem desirable. I I, hand-levers. By drawing these levers toward each other pressure is brought to bear upon the two friction-pulleys $r$ $r$ by the cam portion $s$ of the levers, the two pieces forming the draw-bar being thereby locked together, and the end of a skin placed between them securely griped. These levers unlock at once by a simple pull upon a handle, $t$, placed upon the center of the draw-bar nearest the workman. K K, guide-rods, upon which the draw-bar H slides in approaching or receding from the knife-cylinder.

The action is as follows: The workman, having locked the skin in the draw-bar H, gives the part to be operated upon by the knives to the feed-roller E, and by pressing with his foot upon the treadle lifts the roller until the skin comes against the knives of the cylinder B, set revolving by any available means. If the workman finds that one part of the skin requires more dressing than another, he will keep the draw-bar stationary until this part is sufficiently treated before he allows it to pass beyond the cylinder B by permitting the draw-bar to slide nearer thereto; and when he wishes to turn the skin to operate upon that part which has hitherto been held in the draw-bar, he removes his foot from the treadle, the feed-roller lowers, and, the skin being thus removed from the knives, he has only to unlock the draw-bar, gripe another part of the skin therein, and repeat the operation. When the workman desires to secure a certain pressure of skin against the knives he simply turns the regulating-screw of the treadle—an operation effected with the greatest ease and rapidity.

Many combinations of driving-gear might be adopted to give mechanical motion to the draw-bar H—for example, the power-gear shown in Fig. 3, Sheet 2, which I will now describe. $a$ indicates the shaft or axle of knife-cylinder B; $b$, small pulley on one end of $a$; $c$, lower pulley, driven from $a$ and communicating motion to the wheels $d\ e\ f\ g$; $d\ e\ f\ g$, toothed wheels, in gear together; $h\ i$, band-pulleys; $k$, loose belt or band; $l$, rope-pulley; $m$, rope; $n$, guide for rope; $o$, friction-pulley; $p$, lever for carrying the same.

The action is as follows: By means of the pulleys $b\ c$ and wheels $d\ e\ f\ g$ the lower band-pulley, $h$, is caused to revolve as soon as the machine is set in motion. When it is required to impart motion to the draw-bar H the band or belt $k$ is tightened by means of the lever $p$ and friction-pulley $o$, which causes the upper pulleys, $i$ and $l$, to revolve, the rope $m$ being thereby wound upon the pulley $l$, and the draw-bar H made to traverse the guide-rods K K, as required.

The object of applying power-gear to work the draw-bar H is to facilitate the dressing of very large skins. The operation is, however, precisely similar to that of the machine shown, Figs. 1 and 2.

Having thus fully described my invention, what I claim as new, and desire to secure by Letters Patent, is—

1. The combination, with the hinged table D, feed-roller E, and treadle F, of the draw-bar H, substantially as and for the purposes set forth.

2. The draw-bar H, with its locking-levers I I and anti-friction pulleys, in combination with the guide-rods K K, constructed and adapted to operate substantially in the manner and for the purpose set forth.

CHARLES MOLINIER.

Witnesses:
THÉODORE LA LANGE,
GUILLAUME BARBE.